United States Patent
Heiberger et al.

(10) Patent No.: US 9,822,574 B2
(45) Date of Patent: Nov. 21, 2017

(54) POWER TAILGATE ACTUATOR

(71) Applicant: Hi-Lex Controls, Inc., Rochester Hills, MI (US)

(72) Inventors: John M. Heiberger, Grand Blanc, MI (US); Kevin Koneval, Macomb Township, MI (US); Fred Eberle, Lake Orion, MI (US); Eric Thomas, Clinton Township, MI (US); Stephen J. Brinck, Rochester Hills, MI (US)

(73) Assignee: HI-LEX CONTROLS INC., Rochester Hills, MI (US)

( * ) Notice: Subject to any disclaimer, the term of this patent is extended or adjusted under 35 U.S.C. 154(b) by 165 days.

(21) Appl. No.: 14/866,084

(22) Filed: Sep. 25, 2015

(65) Prior Publication Data

US 2017/0089116 A1 Mar. 30, 2017

(51) Int. Cl.
| | |
|---|---|
| *B60P 1/267* | (2006.01) |
| *E05F 15/614* | (2015.01) |
| *B62D 33/027* | (2006.01) |
| *F16H 19/00* | (2006.01) |

(52) U.S. Cl.
CPC ........ *E05F 15/614* (2015.01); *B62D 33/0273* (2013.01); *F16H 19/001* (2013.01); *E05Y 2201/216* (2013.01); *E05Y 2201/72* (2013.01); *E05Y 2800/11* (2013.01); *E05Y 2900/546* (2013.01)

(58) Field of Classification Search
CPC .. E05F 15/614; B62D 33/0273; F16H 19/001; F16H 1/28; E05Y 2201/434; E05Y 2201/71; E05Y 2201/72; E05Y 2400/36; E05Y 2400/44; E05Y 2600/46; E05Y 2900/546
See application file for complete search history.

(56) References Cited

U.S. PATENT DOCUMENTS

| | | | |
|---|---|---|---|
| 4,702,511 | A | 10/1987 | Olins |
| 5,563,483 | A | 10/1996 | Kowall et al. |
| 6,137,419 | A | 10/2000 | Lennox et al. |
| 6,905,156 | B2 | 6/2005 | Miller et al. |
| 7,248,011 | B2 | 7/2007 | Schachtl et al. |
| 7,540,554 | B2 | 6/2009 | Bals |
| 7,695,043 | B2 | 4/2010 | Zagoroff |
| RE41,560 | E | 8/2010 | Miller et al. |
| 8,544,930 | B2 | 10/2013 | Ravenscroft |
| 8,585,124 | B2 | 11/2013 | Oberle et al. |
| 8,684,441 | B2 | 4/2014 | Kerr, III |
| 2007/0152471 | A1 | 7/2007 | Zagoroff |
| 2014/0324251 | A1 | 10/2014 | Hansen |

*Primary Examiner* — Lori L Lyjak
(74) *Attorney, Agent, or Firm* — Brinks Gilson & Lione (57) ABSTRACT

An actuator for opening and closing a hinged device is provided. In particular, the actuator is a power tailgate actuator. The actuator comprises a motor with a rotor, and an output shaft that rotates on an axis which is substantially parallel to the axis on which lies the rotor of the motor. The actuator has a rotary position sensor such as a rotary potentiometer which positively identifies the position of the tailgate. The tailgate also comprises a clutch which can engage and disengage depending on the mode of operation.

19 Claims, 6 Drawing Sheets

POWER TAILGATE ACTUATOR

FIELD OF THE INVENTION

This invention relates to systems for opening and closing hinged closure panels, particularly the tailgate of a truck, in a controlled fashion.

BACKGROUND

Many light trucks have tailgates that can open to extend the bed and permit loading and unloading, and close to create a confined area. Typically, the range of motion of the tailgate is through about 90 degrees from the opened to the closed positions, with the inner surface of the tailgate being roughly aligned with the bed in the open position.

As technologies improve and proliferate, drivers of passenger cars and light trucks expect more automation and convenience, with automatic opening of the tailgate becoming a standard feature. However, power actuation is not always desired, as drivers may wish to operate the tailgate manually as well. Although complex systems involving a plurality of sensors and computer components could be developed, consumers prefer to have these features without the burden of excessive cost.

It has been a challenge to develop a mechanism for opening and shutting a tailgate which can be operated in a powered mode or by manual effort, and which is capable of tracking the position of the tailgate regardless of the mode in which the device is operated, and to do so with cost-effective components. Moreover, design requirements and constraints for this application include high torque loads necessary to move a tailgate between the positions while providing the desired manual actuation override and safety provisions.

SUMMARY OF THE INVENTION

In one aspect, the present disclosure provides an actuator for operating a hinge mechanism coupling a door to a body. The actuator has a motor for moving the hinge between a closed position and an open position, and the motor has a rotor which extends along a first axis. The actuator has a gear mounted on a gear shaft in rotatable connection with the rotor of the motor. The actuator also has a rotary position encoder coupled to the gear shaft. The rotary position encoder undergoes no more than one revolution when the hinge is moved between the closed position and the open position. There is also a hinge rod for driving the rotation of the door, the hinge rod extending along a second axis substantially parallel to the first axis.

In another aspect, the present disclosure provides an actuator for operating a hinge mechanism coupling a door to a body. The actuator has a motor for moving the hinge between a closed position and an open position. The motor has a rotor which extends along a first axis. The actuator also has a gear mounted on a gear shaft which is in rotatable connection with the rotor. The actuator has a rotary position encoder coupled to the gear shaft. Further, there is a clutch positioned between the gear shaft and the motor. The positioning of the rotary position encoder opposite the motor from the clutch allows the absolute position of the tailgate to be known independent of operation of the motor.

DETAILED DESCRIPTION OF THE INVENTION

It will be appreciated that drawings in this disclosure are not necessarily to scale, with some components enlarged relative to their actual size in order to show detail.

The terms "substantially," "about," or derivatives thereof will be understood to mean significantly, effectively, or in large part.

Figure 1:
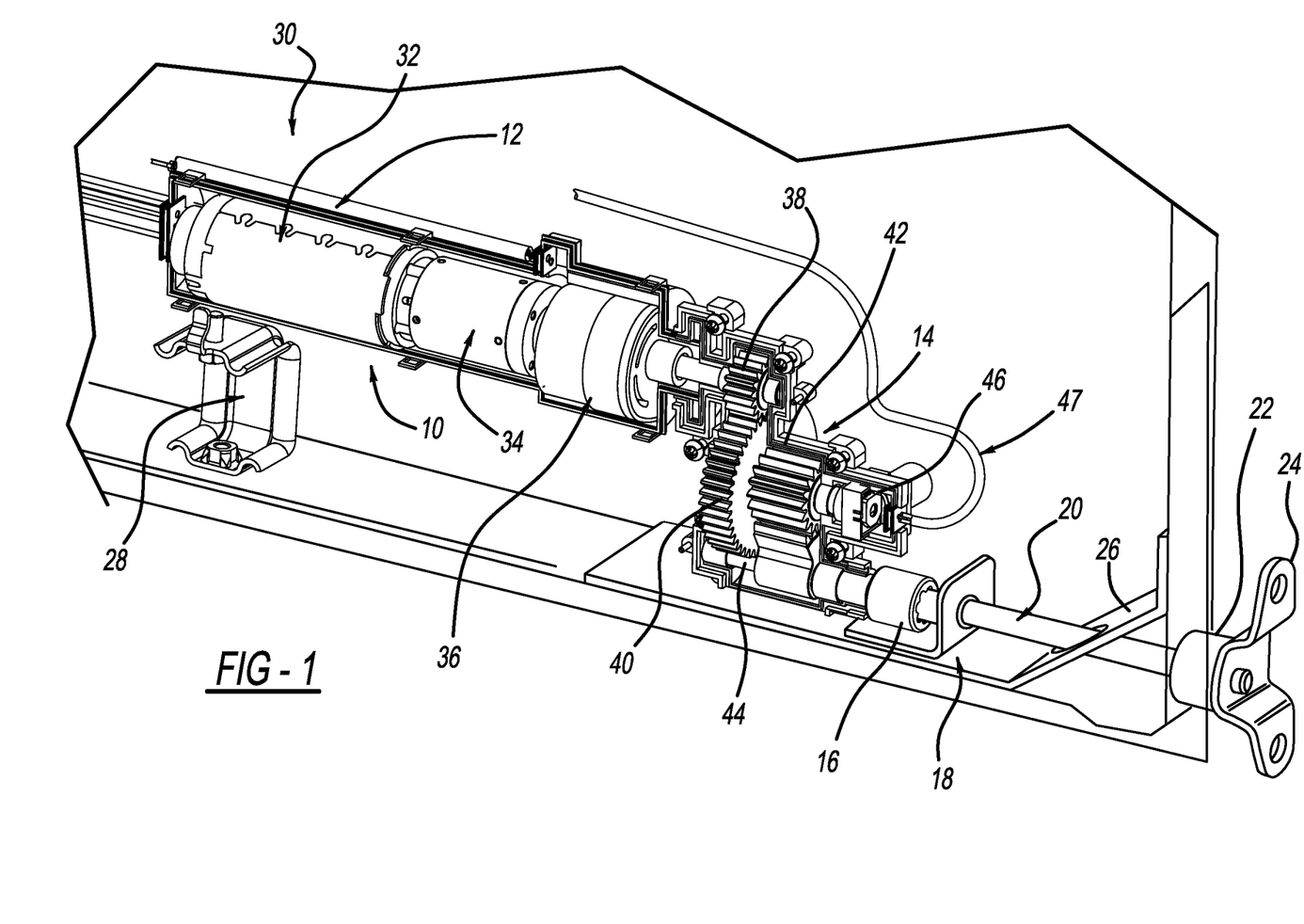
FIG. 1 is a cross-sectional view of a power tailgate actuator in accordance with one embodiment of the present disclosure.

FIG. 1 shows a power tailgate actuator 10 in accordance with one embodiment of the present invention. The actuator 10 has a motor 32 which is enclosed within motor housing 12. The motor 32 includes a rotor which turns to provide the mechanical energy to drive lifting and lowering of the tailgate 30. The rotational motion of the rotor is transmitted through the planetary gearbox 34. Planetary gearbox 34 is housed within gear housing 14. The gears of the planetary gearbox provide a gear reduction from the rotation of the rotor of motor 32. The planetary gearbox 34 is in turn connected to clutch 36, the function of which will be described in detail below.

It will be appreciated that while the embodiment FIG. 1 is a tailgate for a light truck, the invention of the present disclosure can be applied to any hinged mechanism which couples a first portion (such as a door) to a second portion (such as a body. The motor moves the hinge between a closed position and an open position.

In the illustrated embodiment, on the opposite end of clutch 36 from planetary gearbox 34 is pinion gear 38. Pinion gear 38 is mounted on pinion shaft 57, which rotates in proportion to the rotation of the motor 32 when clutch 36 is engaged. In the embodiment illustrated in FIG. 1, the pinion shaft 57 is substantially coaxial with the rotor of motor 32.

Pinion gear 38 meshes with compound gear having spur gear portions 40 and 42. Spur gear portions 40 and 42 surmount gear shaft 59, which is on a second axis running parallel to the axis running through pinion shaft 57. The compound gear provides another gear reduction, and coupled to gear shaft 59 is rotary position sensor 46. In the embodiment illustrated in FIG. 1, which is shown in exploded view in FIG. 3, the gear reduction is such that the gear shaft 59 rotates through less than one-half revolution. In the illustrated embodiment, the gear shaft 59 rotates about 0.42 revolutions or between about 150 degrees and about 160 degrees, particularly about 151.2 degrees. Many other configurations are possible, including gear reductions which rotate through about 0.25 revolutions, about 0.33 revolutions, about 0.5 revolutions, about 0.66 revolutions, about 0.75 revolutions, about 0.8 revolutions, about 0.99 revolutions, and between about 0.25 revolutions and about 0.99 revolutions, inclusive.

Any device capable of collecting and reporting positional information may be used as a rotational position sensor. In one embodiment, the sensor 46 may be a Hall effect sensor. In a preferred embodiment, the rotary position sensor is in the form of a rotary potentiometer.

A rotary potentiometer is a particularly attractive option for use with rotary position sensor 46 for a number of reasons. First, these components are simple to use and install and are inexpensive. Second, the analog rotary potentiometer can provide a reliable, absolute position signal related to the position of the tailgate. Installing the rotary position sensor 46 at the position illustrated in FIG. 1 ensures that the gear shaft 59 always turns in proportion to the amount the output shaft (or hinge rod) 20 turns, regardless of engagement of the clutch; if the output shaft 20 rotates, the wiper of the rotary potentiometer moves in concert with it. If it does not, the wiper remains stationary at its position on the resistive track of the rotary potentiometer. Sensor wire 47 is attached to the rotary position sensor 46, providing a means of transmitting positional information from the sensor to other portions of the tailgate actuation system. Typical and inexpensive rotary potentiometers are capable of rotation over less than one full turn (360°). Such devices may be used as rotary position sensor 46 since gear shaft 59 rotates less than a full revolution.

Vertically below the axis to which the rotary position sensor 46 is coupled, and meshing with the larger gear portion 40 of spur gear 40 and 42, is sector gear 61. Sector gear 61 is capable of making about a quarter of a rotation and drives the rotational movement of shaft 44. Shaft 44 extends along a third longitudinal axis which runs substantially parallel to the first axis and the second axis. Shaft 44 terminates in output shaft coupling 16, which is mated to output shaft 20, which ultimately provides the motion and energy for raising and lowering of tailgate 30. As mentioned previously, truck tailgates typically move through a 90-degree range of motion from the closed position to the open position. Hence, sector gear 61, by providing substantially a quarter of a revolution of rotational range, controls the extent of the rotation of output shaft 20. Output shaft 20 passes through the side of the tailgate 30 and into output cup 22 and governs the motion of double-D interface 24.

The tailgate of FIG. 1 is illustrated in cross-sectional view. The outermost wall (that is, the wall that would be furthest from the cab of the truck) is cut away to expose a view of the tailgate actuator assembly 10 which is housed within the tailgate 30 itself. The tailgate has an outer panel, an interior panel (which encloses the bed in the closed position and extends the bed in the open position) and an interior space between the outer panel and the interior panel. It is in this space that the power tailgate actuator 10 is mounted. The axial displacement of the hinge rod 20 from the rotor axis of motor 32 permits the actuator to be of a size which is capable of producing the power required to lift and lower the tailgate, but still be compact enough to fit within the interior of the tailgate, particularly as the interior space narrows at the top and the bottom of the tailgate.

The power tailgate actuator 10 can be mounted to the interior of tailgate 30 by any conventional method. In the embodiment illustrated in FIG. 1, mounting bracket 28 is attached to motor cover 12 and to the base of the interior of tailgate 30. Reinforcing bracket 26 is attached at its first portion to the base of the interior of tailgate 30, angles away from the base to form a second portion having a hole formed therethrough to accommodate the output shaft 20, and is angled again toward an interior sidewall of the tailgate 30. The reinforcing bracket 26 acts to reinforce the tailgate 30 in order to compensate for the high torsional load that accompanies operation of the actuator. L bracket 18 is mounted to reinforcing bracket 26 and has a hole which houses and guides the output shaft 20.

In the embodiment of FIG. 1, the power tailgate actuator 10 is depicted with a clutch 36 positioned between the planetary gearbox 34 and the pinion shaft 57. The clutch 36 may be of any construction known in the art. In a preferred embodiment, the clutch 36 is an electromagnetic clutch. The clutch 36 serves a number of purposes.

As mentioned previously, the tailgate actuator 10 has an automatic operation mode, in which an electronic control unit sends a signal to the tailgate actuator and instructs it to open or close, and a manual operation mode, in which a human user manually opens and closes the tailgate.

In the power actuated mode, the clutch 36 is active in both the opening and the closing directions. While in power actuated mode, the actuator system monitors the position of the tailgate and processes the signal from the rotary position sensor 46 in order to control the speed of the door and as an anti-pinch precaution.

When the system is in manual mode and the tailgate 30 is being opened manually by the operator, the clutch 36 and the motor 32 are active to facilitate action by the user. When the rotary position encoder 46 detects that the tailgate 30 is opening and the electronic control unit 50 is in manual mode, the clutch 36 engages to slow and control the speed at which the tailgate opens. Incorporating the rotary position encoder 46 at a point in the actuator 10 such that absolute position can be ascertained allows the clutch 36 to be used, if desired, as the sole means of damping, minimizing the number of components that need to be incorporated into the tailgate assembly.

When the system is in manual mode and the tailgate 30 is being closed, the clutch and the motor are both inactive. Because the rotary position sensor 46 is positioned on the opposite side of the clutch 36 from planetary gearbox 34 and motor 32, it is able to continue to reflect the correct, absolute position of the tailgate as the user closes it, while the clutch decouples the rotation of the output shaft 20 from that of the planetary gearbox 34. Thus, the gears of the planetary gearbox, which provide a significantly high gear reduction, are not backdriven by manual closing of the tailgate, avoiding damage to the assembly.

The clutch 36 further has the capacity to slip when situations that could damage the actuator 10 arise. For instance, if a heavy load has been placed on the tailgate and a user instructs the system to lift the tailgate, the clutch will inactivate, preventing the transmission of an excessive load to the gear train. Further, if the system is in power actuated mode and a user attempts to close or open the tailgate more quickly or in uncontrolled fashion, the clutch will slip for the same reason.

Figures 2, 5:
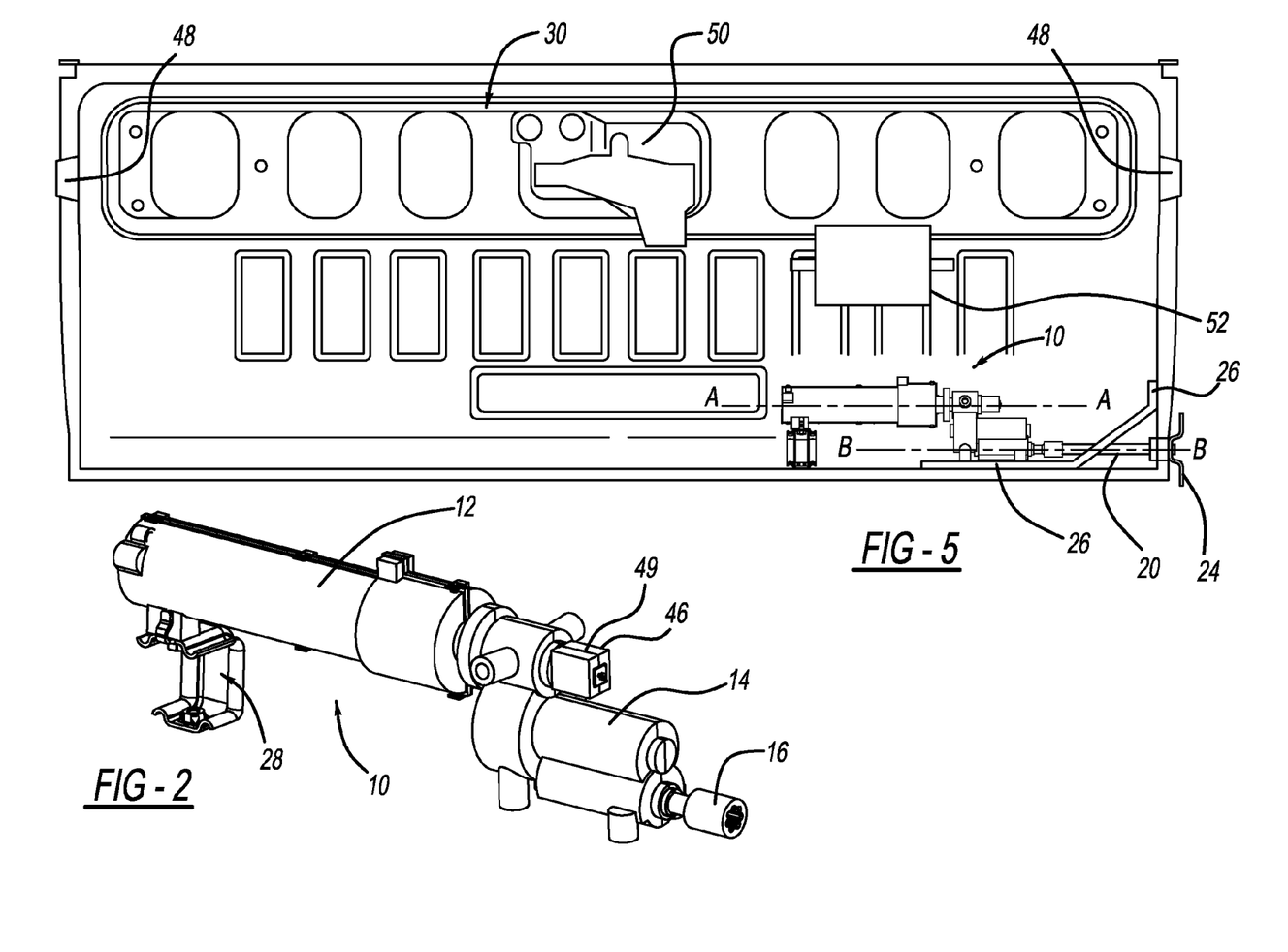
FIG. 2 is a perspective view of a power tailgate actuator in accordance with one embodiment of the present disclosure.
FIG. 5 is a schematic view of the components associated with a power tailgate actuator within a tailgate in accordance with another embodiment of the present disclosure.

FIG. 2 illustrates the view of power tailgate actuator 10 of FIG. 1, though without a cutaway view of the internal components. In this figure, the attachment of mounting bracket 28 to the motor cover 12 can be clearly seen. Rotary position encoder 46 is enclosed by housing 49.

Figure 3:
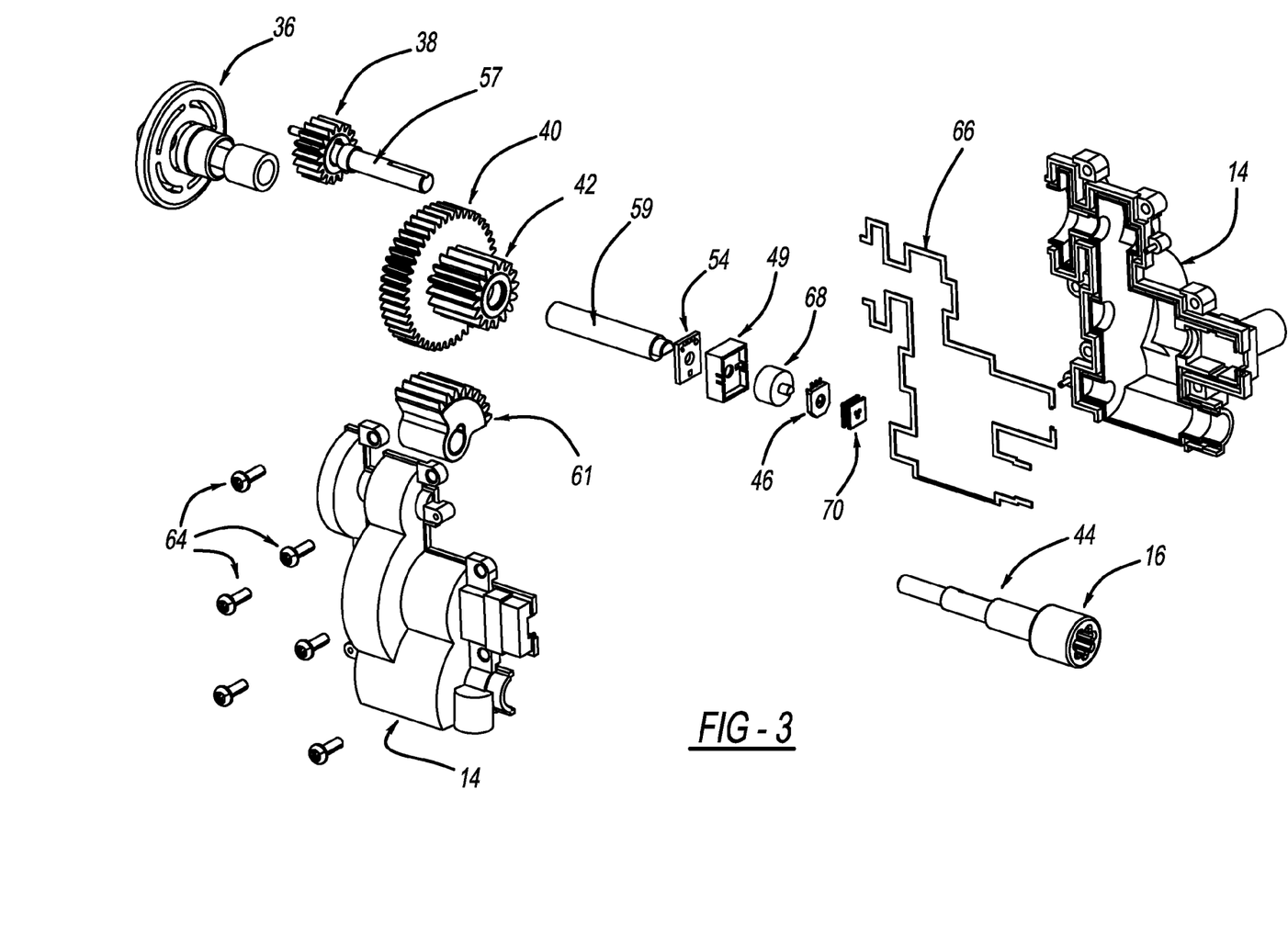
FIG. 3 is an exploded view of a gear reduction and position sensor in accordance with one embodiment of the present disclosure.

FIG. 3 provides a view of components that make up the power tailgate actuator 10 individually. A component of clutch 36 is positioned near pinion 38 and its shaft. Pinion 38 meshes with spur gear portion 40 of compound spur gear 40 and 42, which rotates in conjunction with gear shaft 59. Gear shaft 59 transmits rotation to sensor coupling 68, which in turn acts to rotate rotary position encoder 46. Rotary position encoder is wired to printed circuit board 54 and housed with it in housing 49, and is capped with grommet 70.

In this embodiment, spur gear portion 42 of compound gear 40 and 42 meshes with sector gear 61, which is positioned on shaft 46. Shaft 46 terminates in output shaft coupling 16, which engages the output shaft and drives lowering and raising of the tailgate.

In the embodiment of FIG. 3, the gear assembly is housed within gear housing cover 14, which is illustrated in FIG. 3 as two separate halves. The two halves of housing cover 14 come together surrounding the gears and shafts illustrated and meet at gear housing seal 66. Bolts 64 hold the two halves of gear housing cover 14 together.

Figure 4:
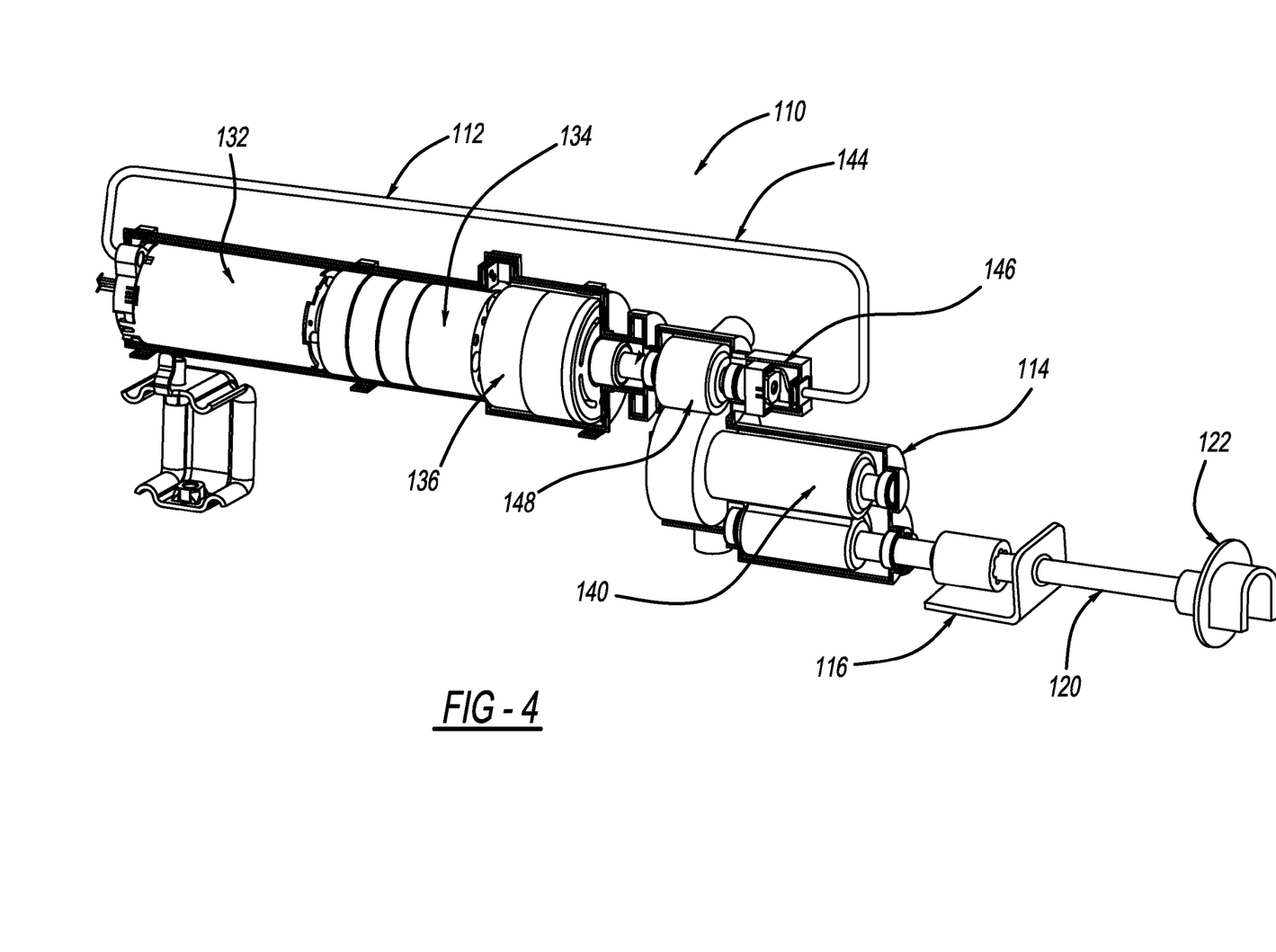
FIG. 4 is a cross-sectional view of a power tailgate actuator in accordance with another embodiment of the present disclosure.

FIG. 4. illustrates another embodiment of a power tailgate actuator 110 in accordance with the principles of the present disclosure. In this embodiment, motor 132 is housed in motor cover 112. Rotational motion from the rotor of motor 132 undergoes a gear reduction via planetary gearbox 134, which is connected to clutch 136. On the opposite end of clutch 136 from the planetary gearbox 134 is shaft 138, which is coupled to rotary position encoder 146. In one embodiment, shaft 138 may be a pinion shaft having a pinion positioned thereon. Further gear reductions 140 are housed within gear housing 114 and are coupled via output shaft coupling 116 to ultimately drive the rotary motion of output shaft 120, which in turn drives tailgate motion between the open and closed positions.

One difference between the device of FIG. 1 and the device of FIG. 4 is the location of the rotary position encoder 46/146. The device of FIG. 4 places the rotary position encoder 146 in the first stage gear reduction, whereas the device of FIG. 1 places the rotary position encoder 46 in a second stage gear reduction. In a device of either construction which has an analog rotary position encoder capable of tracking and reporting the absolute position of the tailgate, the shaft to which the position encoder is mounted must rotate through less than one full rotation. Thus, in the device of FIG. 4, the first stage gear reduction must be configured so that shaft 138 rotates less than a full revolution. Contrarily, no such requirement is in place for the first stage reduction of the device 10 of FIG. 1, so long as the second stage reduction decreases the rotation of the gear shaft to less than one revolution. However this configuration may not enable use of a rotary potentiometer. The electromagnetic clutch 136 of actuator 110 may need to be of a higher capacity than clutch 36 of device 10 in order to compensate for the very high gear reduction that causes the shaft 138 to rotate one time or fewer during operation.

FIG. 5 illustrates an actuator 10 in accordance with the principles of the present disclosure. The rotor of motor 32 rotates about axis A, and axis B is substantially parallel to axis A. Output shaft 20 rotates about axis B. Sensor wire 47 connects the rotary position encoder to electronic control unit 52, which in turn communicates with central brain plate 50. Cinch latches 48 provide a latching closure for the tailgate.

Figure 6A:
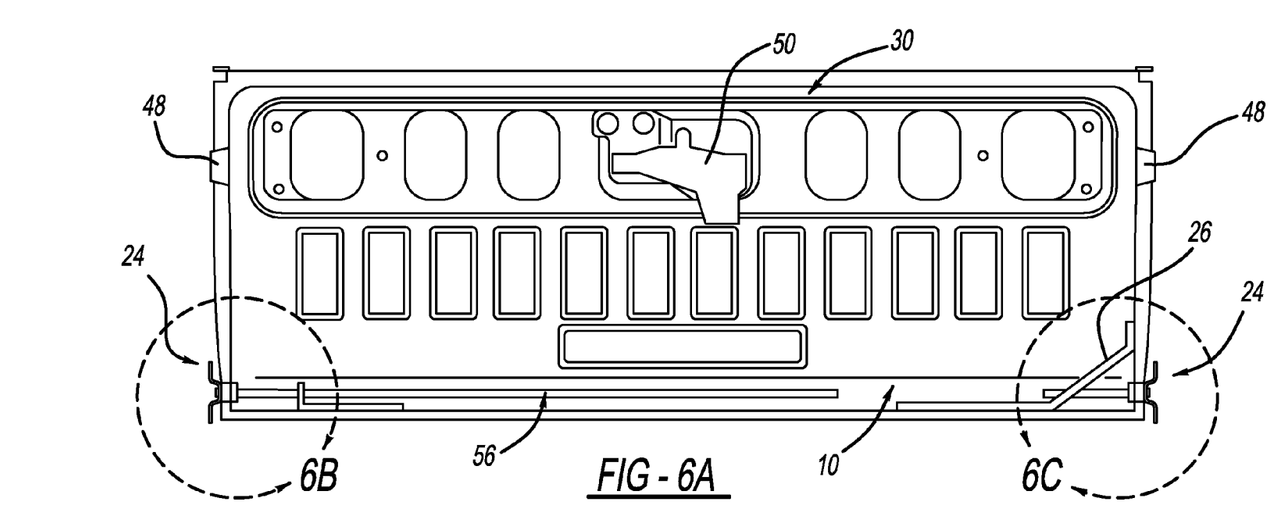
FIG. 6A is a perspective view of the interfaces between the tailgate actuator and a truck tailgate in accordance with one embodiment of the present disclosure.
Figure 6B:
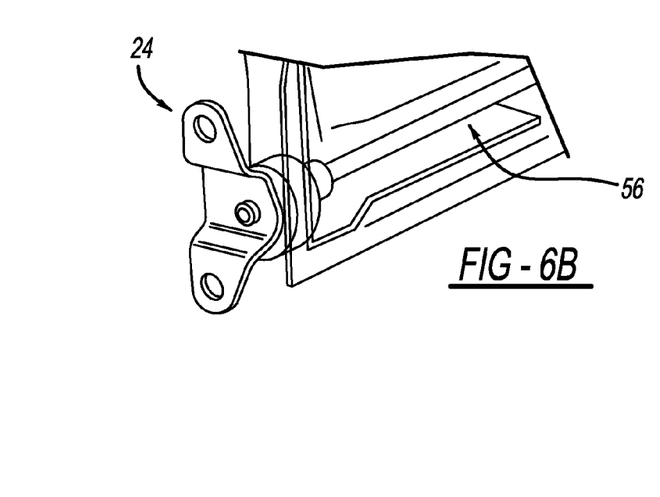
FIG. 6B is a perspective view of the interfaces between the tailgate actuator and a truck tailgate in accordance with an embodiment of the present disclosure.

FIG. 6A provides a view of torsion rod 56, which provides counterweight torsion for reducing the mechanical effort needed for moving the door between the closed position and the open position in any operation mode. As shown in FIG. 6B, the torsion rod 56 extends through the side of the tailgate and is fixed to an interface 24 which is surrounded in part by output cup 22. The interface 24 as illustrated has a double-D geometry and can be mounted to a fixed vehicle bracket. Such a construction allows for simplified assembly and disassembly to the vehicle body structure.

Figure 6C:
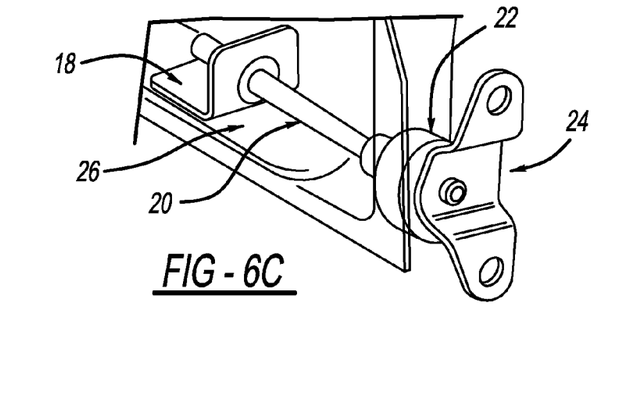
FIG. 6C is a perspective view of the interfaces between the tailgate actuator and a truck tailgate in accordance with an embodiment of the present invention.

The output shaft 20, as shown in FIG. 6C, also emerges through the side of the tailgate in a similar fashion. However, because this shaft is on the power-driven side of the tailgate, an additional reinforcement plate 26 is used to mount the actuator 10. L bracket 18 further constrains the output shaft 20.

Figures 7A, 7B, 8A, 8B:
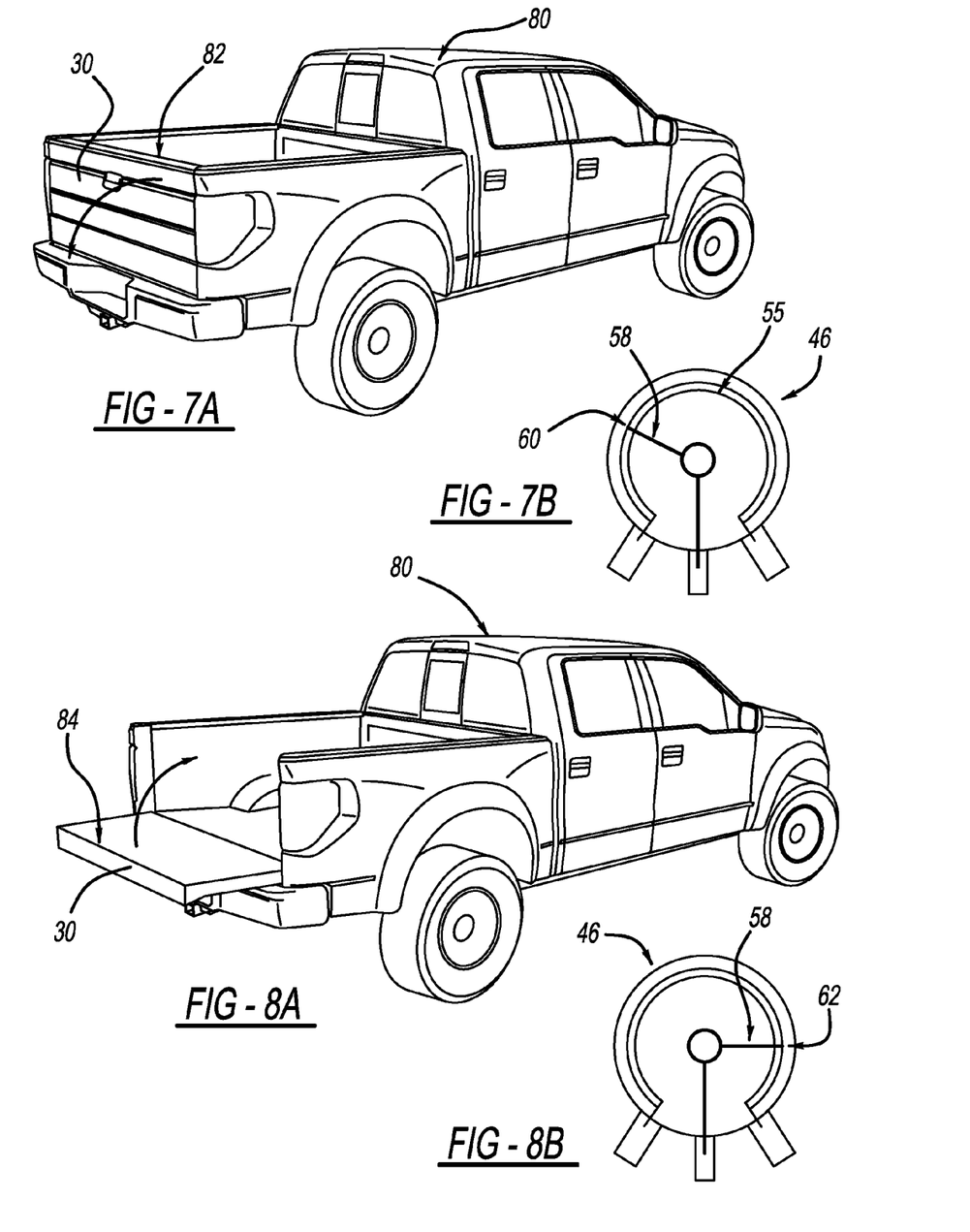
FIG. 7A is a perspective view of a truck having a closed tailgate and in accordance with one embodiment of the present disclosure.
FIG. 7B is a view of a positional sensor when the truck tailgate is positioned as depicted in FIG. 7A.
FIG. 8A is a perspective view of a truck having an open tailgate in accordance with one embodiment of the present disclosure.
FIG. 8B is a view of a positional sensor when the truck tailgate is positioned as depicted in FIG. 8A.

To illustrate the operation of a power tailgate actuator 10/110, a light truck 80 is shown in FIG. 7A with its tailgate 30 in the closed position 82. In one embodiment, the rotary position sensor 46, as shown in FIG. 7B, may be a rotary potentiometer. When the tailgate 30 is in the closed position 82, the wiper 58 is in a first position 60 along track 55. The rotary potentiometer has a characteristic first resistance associated with the wiper (and therefore the tailgate) being in the first position 60, which when transmitted to the electronic control unit, allows or permits certain actions. For instance, if the actuator 10 is in power actuated mode, the indication that the tailgate 30 is in the closed position 82 indicates that the clutch should be active.

FIG. 8A illustrates the same truck 80, but the tailgate 30 is now in the open position 84. In response, the wiper 58 of rotary position encoder 46 has moved to its second position 62 (FIG. 8B), which is associated with a second resistance different from the first resistance. Such a second resistance, when detected by the electronic control unit, may, in one embodiment, cause the clutch to become inactivated if the actuator 10 is in manual operation mode, since doing so will prevent the planetary gearbox from being backdriven upon manual closure of the tailgate.

Should the tailgate 30 be stopped in its motion from open position 84 to closed position 82, the analog rotary position encoder 46 will have a resistance intermediate between the first resistance and the second resistance. The electronic control unit may be programmed with a protocol which could, in one embodiment, produce a warning that the tailgate is stuck, and could, for example, inactivate the clutch in order to minimize damage to the gear structures.

While the above description constitutes the preferred embodiment of the present invention, it will be appreciated that the invention is susceptible to modification, variation, and change without departing from the proper scope and fair meaning of the accompanying claims.

The invention claimed is:

1. An actuator including a motor for moving a hinge between a closed position and an open position, the motor having a rotor which extends along a first axis, the actuator operating a hinge mechanism coupling a door to a body and comprising:
   a gear mounted on a gear shaft in rotatable connection with the rotor of the motor;

a rotary position encoder coupled to the gear shaft, the rotary position encoder undergoing no more than one revolution when the hinge is moved between the closed position and the open position; and a hinge rod for driving the rotation of the door, the hinge rod extending along a second axis substantially parallel to the first axis.

2. The actuator according to claim 1, wherein the rotary position encoder is a rotary potentiometer.

3. The actuator according to claim 1, wherein a clutch is positioned between the gear shaft and the motor.

4. The actuator according to claim 3, wherein the actuator has an power actuated operation mode and a manual operation mode.

5. The actuator according to claim 4, wherein when the actuator is in automatic operation mode, the clutch is configured to engage and disengage in order to control the speed of the door.

6. The actuator according to claim 4, wherein when the actuator is in manual operation mode, the clutch engages to control the speed of opening of the door.

7. The actuator according to claim 4, wherein when the actuator is in manual operation mode, the clutch is disengaged during closing of the door.

8. The actuator according to claim 1, wherein a planetary gearbox is positioned between the shaft and the motor.

9. The actuator according to claim 1, wherein the door is a vehicle tailgate.

10. The actuator according to claim 9, wherein the vehicle tailgate comprises an outer panel, an interior panel, and an inner space between the outer panel and the interior panel, the actuator being mounted in the inner space.

11. The actuator according to claim 1, wherein the shaft rotates through less than one-half revolution.

12. The actuator according to claim 1, wherein the shaft extends along a third axis parallel to the first axis, the gear shaft being positioned vertically above the hinge rod and below the rotor.

13. The actuator according to claim 12, wherein a pinion shaft is rotatably connected to and coaxial with the rotor, a pinion being mounted on the pinion shaft, the pinion being meshed with the gear.

14. The actuator according to claim 13, wherein the gear is a compound gear.

15. The actuator according to claim 1, wherein the rotary position encoder provides positional information to an electronic control unit.

16. An actuator including a motor for moving a hinge between a closed position and an open position, the motor having a rotor which extends along a first axis, the actuator operating a hinge mechanism coupling a door to a body and comprising:

a gear mounted on a gear shaft which is in rotatable connection with the rotor;

a rotary position encoder coupled to the gear shaft; and a clutch positioned between the gear shaft and the motor; and wherein the positioning of the rotary position encoder opposite the motor from the clutch allows the absolute position of the tailgate to be known independent of operation of the motor.

17. The actuator of claim 16 further comprising a hinge rod for driving the rotation of the door, the hinge rod extending along a second axis substantially parallel to the first axis.

18. The actuator of claim 16 wherein the rotary position encoder is a rotary potentiometer.

19. The actuator of claim 17 wherein the rotary potentiometer undergoes no more than a single revolution when the tailgate is opened and closed.

* * * * *